(12) United States Patent
Kaneko et al.

(10) Patent No.: US 7,733,378 B2
(45) Date of Patent: Jun. 8, 2010

(54) MATCHING FRAME RATES OF A VARIABLE FRAME RATE IMAGE SIGNAL WITH ANOTHER IMAGE SIGNAL

(75) Inventors: Katsumi Kaneko, Kanagawa (JP); Taku Kihara, Kanagawa (JP); Fumihiko Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 514 days.

(21) Appl. No.: 10/527,934

(22) PCT Filed: Jul. 16, 2004

(86) PCT No.: PCT/JP2004/010541

§ 371 (c)(1),
(2), (4) Date: Mar. 16, 2005

(87) PCT Pub. No.: WO2005/009030

PCT Pub. Date: Jan. 27, 2005

(65) Prior Publication Data

US 2006/0061666 A1 Mar. 23, 2006

(30) Foreign Application Priority Data

Jul. 18, 2003 (JP) ............................. 2003-276803

(51) Int. Cl.
*H04N 5/225* (2006.01)
(52) U.S. Cl. .................................. 348/220.1
(58) Field of Classification Search .............. 348/439.1, 348/441, 207.1, 473, 474, 434.1, 459, 454, 348/220.1, 575, 625, 252, 426.1, 705, 706, 348/349.1; 386/131, 110, 129, 5, 68; 715/723
See application file for complete search history.

(56) References Cited

U.S. PATENT DOCUMENTS 5,239,418 A 8/1993 Tyler et al.

(Continued)

FOREIGN PATENT DOCUMENTS

EP 1 011 267 6/2000

(Continued)

OTHER PUBLICATIONS

Machine English Translation of JP 11-177930 A (Tonomura) (JP 11-177930 A published on Jul. 2, 1999).*

*Primary Examiner*—Lin Ye
*Assistant Examiner*—Nelson D Hernández Hernández
(74) *Attorney, Agent, or Firm*—Frommer Lawrence & Haug LLP; William S. Frommer; Ellen Marcie Emas (57) ABSTRACT

An image signal generation portion 10 generates an image signal DVb of a variable frame-rate picked-up image whose frame rate can be varied. A frame rate conversion portion 30 converts a frame rate of an image signal DVu supplied to it into a frame rate of the image signal DVb and synchronizes them to provide an image signal DVw. A monitor image signal generation portion 40 uses the image signals DVb and DVw to generate an image signal DVmix of an image in which an image based on the image signal DVb and an image based on the image signal DVw are mixed and output it as a monitor image signal DMTout or SMTout. Alternatively, it generates an image signal DVwp of an image in which a part of an image based on the image signal DVb is replaced by an image based on the image signal DVw and outputs it as the monitor image signal DMTout or SMTout. It is possible to simultaneously display a variable frame-rate picked-up image and an image having a different frame rate.

17 Claims, 6 Drawing Sheets

U.S. PATENT DOCUMENTS

| | | | |
|---|---|---|---|
| 5,428,399 A * | 6/1995 | Robinson et al. | 348/459 |
| 5,453,780 A * | 9/1995 | Chen et al. | 348/14.07 |
| 5,659,382 A * | 8/1997 | Rybczynski | 352/46 |
| 5,739,894 A * | 4/1998 | Weisgerber | 352/46 |
| 6,738,075 B1 * | 5/2004 | Torres et al. | 715/723 |
| 6,848,792 B1 * | 2/2005 | De Meerleer | 353/30 |
| 2002/0021364 A1 * | 2/2002 | Asada et al. | 348/312 |
| 2002/0106184 A1 * | 8/2002 | Belley et al. | 386/46 |
| 2003/0146981 A1 * | 8/2003 | Bean et al. | 348/222.1 |

FOREIGN PATENT DOCUMENTS

| | | |
|---|---|---|
| JP | 11-177930 | 7/1999 |
| JP | 2000-125210 | 4/2000 |
| JP | 2002-152569 | 5/2002 |
| JP | 2002-320203 | 10/2002 |
| JP | 2004-7543 | 1/2004 |

* cited by examiner

| VARIABLE FRAME RATE, FRc | NUMBER OF ADDED FRAMES, FA | IMAGE PICK-UP FRAME RATE, FRp=FRc×FA |
|---|---|---|
| 60P≧FRc>30P | 1 | 60P≧FRp>30P |
| 30P≧FRc>20P | 2 | 60P≧FRp>40P |
| 20P≧FRc>15P | 3 | 60P≧FRp>45P |
| 15P≧FRc>12P | 4 | 60P≧FRp>48P |
| 12P≧FRc>10P | 5 | 60P≧FRp>50P |
| 10P≧FRc>6P | 6 | 60P≧FRp>36P |
| 6P≧FRc>5P | 10 | 60P≧FRp>50P |
| 5P≧FRc>4P | 12 | 60P≧FRp>48P |
| 4P≧FRc>3P | 15 | 60P≧FRp>45P |
| 3P≧FRc>2P | 20 | 60P≧FRp>40P |
| 2P≧FRc>1P | 30 | 60P≧FRp>30P |
| 1P | 60 | 60P |

MATCHING FRAME RATES OF A VARIABLE FRAME RATE IMAGE SIGNAL WITH ANOTHER IMAGE SIGNAL

TECHNICAL FIELD

The present invention relates to an image pick-up device. More specifically, it relates to an operation of matching frame rate of a first image signal of a variable frame-rate picked-up image and that of a second image signal supplied from an outside with each other and using these first and second image signals having this matched frame rate to generate a monitor image signal.

BACKGROUND ART

In conventional filmmaking etc., to obtain special video effects, scenes have been shot in condition where a shooting speed of a film camera, that is, the number of frames per second has been varied. For example, if a scene is shot at a higher speed than an ordinary one and reproduced at the ordinary speed, images are reproduced slowly. Therefore, fast motion of, for example, a water droplet falling into the water can be observed easily and in detail. If a scene is shot at a lower speed than the ordinary one and reproduced at the ordinary speed, on the other hand, fast motion of reproduced images can be seen. It is thus possible to enhance a sense of speed in a fight scene, a car chase scene, etc., thereby presenting images with an enhanced sense of reality.

Further, in TV program making etc., while an attempt has been made to digitize processing of image pick-up, editing, delivery, etc. of a program, an attempt has been made to digitize processing in film making etc. also as fueled by an increase in image quality and a decrease in costs of equipment caused by progress in digital technologies.

In a case where images are picked up by using an image pick-up device (video camera) due to digitization of filmmaking etc., in order to obtain special video effects as described above, for example, not only an image signal obtained by image pick-up at a predetermined speed but also an image signal obtained by high-speed or low-speed image pick-up are all recorded in a recording device such as a server. Next, an image signal of frame images required to obtain the special video effects from these recorded image signals is read and subjected to image processing to generate an image signal with special video-effects.

Further, to easily obtain special video effects such as fast reproduction and slow reproduction, an image pick-up device capable of varying a frame rate as disclosed in Jpn. Pat. Appln. KOKAI Publication No. 2000-125210 can be used to pick up images at a lower frame rate than a predetermined frame rate and reproduce them at this predetermined frame rate so that fast reproduction images may be obtained easily. By picking up images at a higher frame rate and reproducing them at the predetermined frame rate, slow reproduction images can be obtained easily.

Generally, an image pick-up device is set so that when an image recorded in a recording medium such as a video tape or an optical disc is reproduced by using a reproduction device and a reproduced image obtained from, for example, the reproduction device is displayed together with a picked-up image on an electronic viewfinder or a monitor, which is an image display, and then the reproduced image and the picked-up image may be equivalent to each other in terms of picture quality, hue, etc. However, if a frame rate of an image signal generated by an image pick-up device with a variable frame-rate and that of an image signal supplied from a reproduction device are different from each other, these two image signals cannot be synchronized with each other, so that the reproduced image and the picked-up image cannot be displayed simultaneously on the image display.

DISCLOSURE OF THE INVENTION

An image pick-up device related to the present invention comprises image signal generation means for generating a first image signal of a variable frame-rate picked-up image, frame rate conversion means for matching a frame rate of the first image signal and a frame rate of a second image signal supplied from an outside with each other, and signal generation means for generating a monitor image signal by using the first image signal and the second image signal whose frame rates are matched with each other by the frame rate conversion means.

In the present invention, the frame rate of the first image of a variable frame-rate picked-up image and that of the second image signal supplied from the outside are matched with each other. For example, the frame rate of the second image signal is converted into the frame rate of the first image signal. These first and second image signals whose frame rates are matched with each other are used to generate an image signal of an image in which an image based on the first image signal and an image base on the second image signal are mixed and output it as a monitor image signal. Further, these first and second image signals whose frame rates are matched with each other are used to generate an image signal in which a part of an image based on the first image signal is replaced by an image based on the second image signal and output it as the monitor image signal.

BEST MODE FOR CARRYING OUT THE INVENTION

Figure 1:
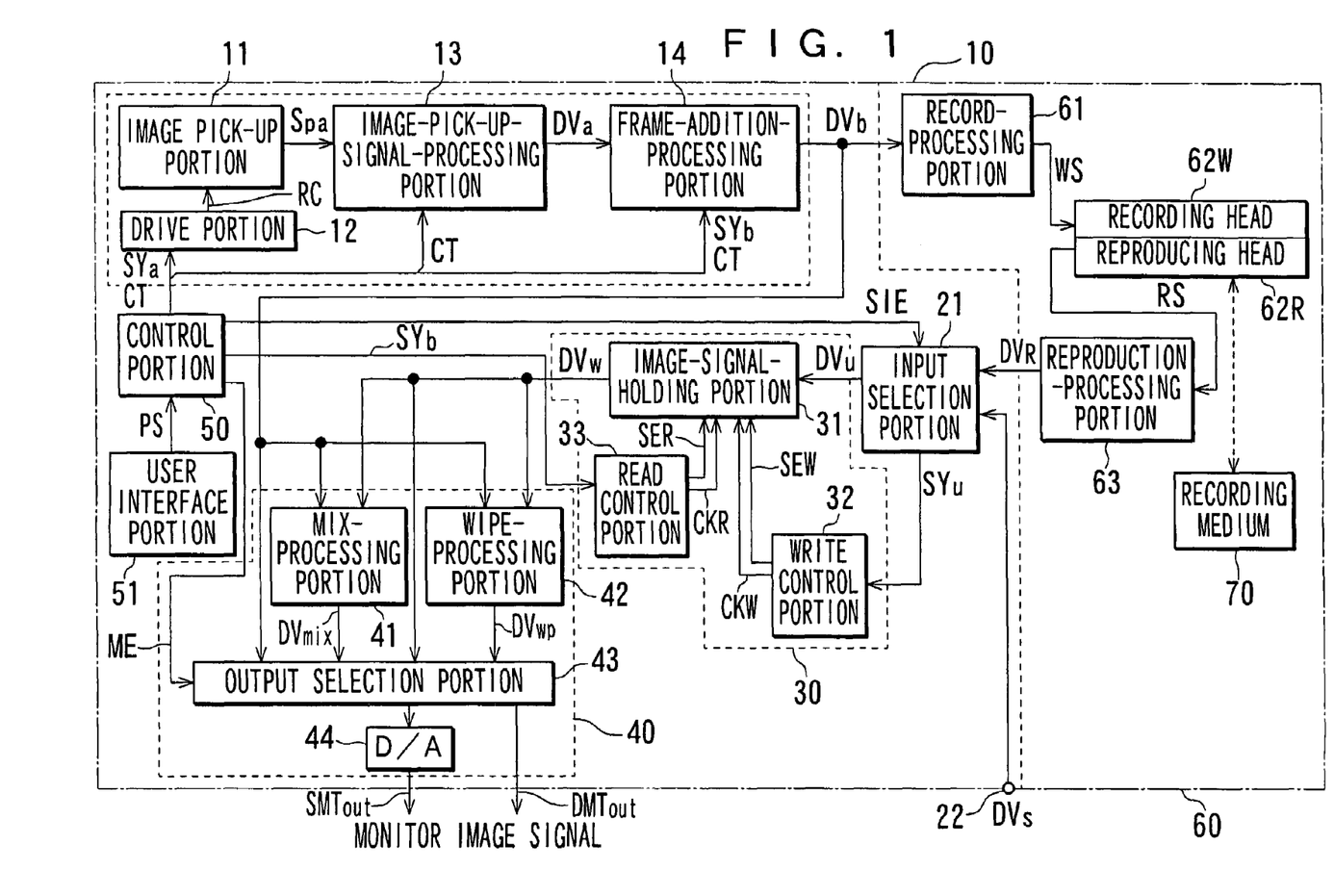
FIG. 1 is a diagram for showing a configuration of an image pick-up device.

The following will describe one embodiment of the present invention with reference to drawings. FIG. 1 shows a configuration of an image pick-up device. An image of a subject based on light entering through an image pick-up lens (not shown) is formed on an image pick-up surface of an image pick-up element (not shown) that constitutes an image pick-up portion 11 in an image signal generation portion 10. The image pick-up element generates image pick-up charge for the subject image through photoelectric transfer and reads this image pick-up charge based on a drive-and-control signal RC supplied from a drive portion 12 to convert it into a voltage signal. Furthermore, it supplies this voltage signal as a picked-up image signal Spa to an image-pick-up-signal-processing portion 13.

The drive portion 12 generates the drive-and-control signal RC based on a control signal CT and a synchronization signal SYa that are supplied from a control portion 50, which will be described later, and supplies it to the image pick-up portion 11.

The image-pick-up-signal-processing portion 13 amplifies the picked-up image signal Spa and removes a noise component from it. Further, it converts this noise-free image signal into a digital signal and performs feedback clamp processing, flare correction, correction processing on a defect of the image pick-up element, process treatment, etc. to generate an image signal DVa. This image signal DVa is supplied to a frame-addition-processing portion 14. It is to be noted that the signal processing performed by the image-pick-up-signal-processing portion 13 is set on the basis of the control signal CT supplied from the control portion 50, which will be described later.

The frame-addition-processing portion 14 performs frame addition processing on the image signal DVa to vary a frame rate of the image signal DVa. This frame addition processing can be performed using a random access memory (RAM). For example, to perform 3-frame addition, a first frame of the image signal DVa is stored in an RAM-1, the signal stored in which is read and added to a second frame of the image signal DVa and stored in an RAM-2. The sum signal stored in this RAM-2 is read and added to a third frame of the image signal DVa and stored in an RAM-3. The signal stored in this RAM-3 thus makes a sum signal of the three frames of the image signal DVa, so that by reading this signal and multiplying its signal level by ($\frac{1}{3}$), a required signal level is obtained. Further, a fourth frame of the image signal DVa is stored in the RAM-1, the signal stored in which is read and added to a fifth frame of the image signal DVa and stored in the RAM-2. The sum signal stored in the RAM-2 is read and added to a sixth frame of the image signal DVa and stored in the RAM-3. The signal stored in this RAM-3 thus makes a sum signal of the three frames of the image signal DVa, so that by reading this signal and multiplying its signal level by ($\frac{1}{3}$), a required signal level is obtained. Similarly, subsequent three frames of the image signal DVa are added up to sequentially generate an image signal having a required signal level.

Further, if the signals thus sequentially generated are read at a predetermined output frame, an image signal DVb such that a picked-up image having a frame rate obtained by multiplying the frame rate of the image signal DVa by $\frac{1}{3}$ is contained in the image signal having the output frame is given.

It is to be noted that the frame addition processing can be performed also using a frame delay circuit. For example, the first frame of the image signal DVa is delayed by a period of two frames through the frame delay circuit and the second frame of the image signal DVa is delayed by a period of one frame through the frame delay circuit. These delayed first frame of the image signal and second frame of the image signal DVa are added to the third frame of the image signal DVa to obtain a signal in which the image signal DVa of three-frames is added. By reading this signal, as described above, at a predetermined frame rate in synchronization with, for example, a synchronization signal SYb supplied from the control portion 50 and then multiplying its signal level by ($\frac{1}{3}$), an image signal DVb, which has a predetermined signal level, such that a picked-up image having a frame rate obtained by multiplying the frame rate of the image signal DVa by $\frac{1}{3}$ is contained in the image signal having the output frame rate can be obtained.

By thus performing the frame addition processing, if a frame rate of the image signal DVa is, for example, "60P" (where the numeral indicates the number of frames per second and P stands for progressive signal, which holds true also with the other cases) and the number of added frames is two, an image signal that contains a picked-up image having a frame rate of "30P" can be obtained. If the number of added frames is four, an image signal that contains a picked-up image having a frame rate of "15P" can be obtained.

Furthermore, not only by changing over the number of added frames but also by controlling signal reading from the image pick-up element so as to vary the frame rate of the picked-up image signal Spa, the frame rate of the picked-up image can be varied continuously, thus generating the image signal DVb having the output frame rate in which a variable frame-rate picked-up image, which has been picked up at a desired frame rate, is contained.

To vary the frame rate of the picked-up image signal Spa, the drive-and-control signal RC supplied from the drive portion 12 to the image pick-up portion 11 can be used to control a charge accumulation period, an image pick-up charge read timing, etc. at the image pick-up element, thereby obtaining the picked-up image signal Spa with the varied frame rate. Furthermore, by performing variation process on the image pick-up frame rate FRp by adjusting a length of a horizontal or vertical blanking interval on the assumption that the common data rate scheme (CDR: common sampling frequency scheme) is used, it is possible to generate such a picked-up image signal Spa that an image size in a valid screen period does not change even if the image pick-up frame rate FRp is varied. Further, by using the CDR scheme, it becomes unnecessary to vary an operating frequency of each of the components that use the image pick-up frame rate FRp in accordance with the image pick-up frame rate FRp, thereby simplifying the configuration.

In such a manner, the image signal DVb having an output frame rate generated by the frame-addition-processing portion 14 is supplied to a mix-processing portion 41, a wipe-processing portion 42, and an output selection portion 43 in a monitor image signal generation portion 40 and a record-processing portion 61 in a recording-and-reproducing device 60.

The record-processing portion 61 extracts an image signal of a variable frame-rate picked-up image from the image signal DVb supplied to itself. It further performs modulation processing, error correcting code addition processing, etc. on the extracted image signal, to generate a record signal WS. It supplies this record signal WS to a recording head 62W to record a picked-up image in a recording medium 70. Further, it reads a picked-up image recorded in the recording medium 70 through a reproducing head 62R and supplies an obtained read signal RS to a reproduction-processing portion 63. The reproduction-processing portion 63 performs error correcting processing and demodulation processing and supplies an obtained image signal DVr to an input selection portion 21 of the image pick-up device.

The input selection portion 21 is connected to an input terminal 22, through which the image signal can be supplied. This input selection portion 21, based on an input selection signal SIE from the later-described control portion 50, selects either the image signal DVr supplied from the reproduction-processing portion 63 or an image signal DVs supplied through the input terminal 22. Furthermore, it supplies the selected image signal as an image signal DVu to an image-signal-holding portion 31 in a frame rate conversion portion 30. Further, it supplies a write control portion 32 with a synchronization signal SYu extracted from the image signal DVu to be supplied to the frame rate conversion portion 30.

The write control portion 32 in the frame rate conversion portion 30 generates, based on the supplied synchronization signal SYu, a write clock signal CKW and a write control signal SEW which are used to write the image signal DVu to the image-signal-holding portion 31 and supplies them to the image-signal-holding portion 31.

A read control portion 33 is supplied with the synchronization signal SYb from the control portion 50 and, based on this supplied synchronization signal SYb, generates a read clock signal CKR and a read control signal SER which are used to read an image signal written into the image-signal-holding portion 31 and supplies them to the image-signal-holding portion 31.

Figure 2:
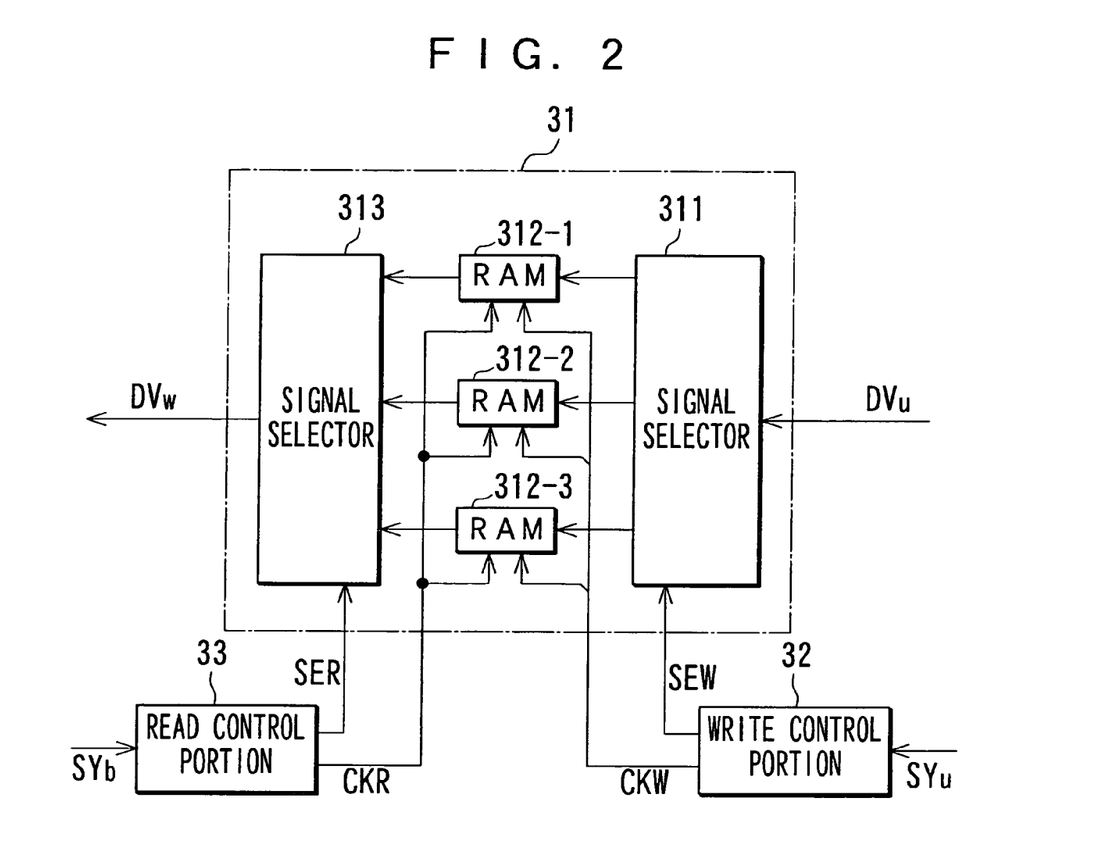
FIG. 2 is a diagram for showing a configuration of an image-signal-holding portion.

FIG. 2 shows a configuration of then image-signal-holding portion 31. The image-signal-holding portion 31 writes the image signal DVu supplied from the input selection portion 21 into a memory and reads the image signal DVu written into this memory in synchronization with the image signal DVb. For example, three RAMs 312-1 through 312-3 are provided and a signal selector 311 is driven by the write control signal SEW, to sequentially allocate the image signals DVu to the RAMs 312-1 through 312-3 in frame units. Further, the write clock signal CKW is supplied to the RAM to which the image signal DVu is allocated, to store the allocated image signal DVu in the RAM. Further, the read clock signal CKR is supplied to the RAMs 312-1 through 312-3 to read the image signals DVu stored in the RAMs 312-1 through 312-3 in synchronization with the image signal DVb. Furthermore, a signal selector 313 is driven by the read control signal SER to select the read image signals DVu in order in which they were allocated and supply them as an image signal DVw to the mix-processing portion 41, the wipe-processing portion 42, and the output selection portion 43.

The mix-processing portion 41 generates an image signal DVmix of an image in which an image based on the image signal DVb and an image based on the image signal DVw are mixed and supplies it to the output selection portion 43. For example, the image signals DVb and DVw are added up and a resultant sum signal has its signal level halved, to generate the image signal DVmix. It is to be noted that a mix control signal from the control portion 50 might well be supplied to the mix-processing portion 41 to vary a mixing ratio between an image based on the image signal DVb and that based on the image signal DVw.

The wipe-processing portion 42 generates an image signal DVwp of an image in which a part of an image based on the image signal DVb is replaced by an image based on the image signal DVw. For example, during the course of vertical scanning or horizontal scanning, the image signals DVb and DVw are switched with each other to generate the image signal DVwp. It is to be noted that a wipe control signal might well be supplied from the control portion 50 to the wipe-processing portion 42 to vary timing for switching between the image signals DVb and DVw.

Based on a monitor output selection signal ME from the control portion 50, the output selection portion 43 selects one of the image signals DVb, DVw, DVmix, and DVwp and outputs it as a monitor image signal DMTout. Further, to output the monitor image signal DMTout as an analog signal, the monitor image signal DMTout can be supplied to a D/A conversion portion 44 so that the monitor image signal DMTout is output as the analog monitor image signal SMTout.

To the control portion 50, a user interface portion 51 is connected. When supplied with an operation signal PS in accordance with a user operation through this user interface portion 51, the control portion 50 generates the control signals CT etc. based on this operation signal PS, to control operations of each of the portions, thereby operating the image pick-up device in accordance with the user operation. Further, when supplied, through the user interface portion 51, with a frame rate set signal RSF which sets a frame rate of a picked-up image, the control portion 50 switches an image pick-up speed at, for example, an operation portion and, when supplied with the frame rate set signal RSF as the operation signal PS or with the frame rate set signal RSF from a remote-control device and external equipment, the control portion 50 uses the control signal CT to control a frame rate of the picked-up image signal Spa to be generated by the image pick-up portion 11 or the number of added frames to be used by the frame-addition-processing portion 14 based on the frame rate set signal RSF. Furthermore, based on the operation signal PS, it generates also the input selection signal SIE and the monitor output selection signal ME. Further, to generate the picked-up image signal Spa, it supplies the synchronization signal SYa to the drive portion 12. Further, to generate an image signal DYb, it supplies the synchronization signal SYb to the frame-addition-processing portion 14 and also supplies this synchronization signal SYb to the read control portion 33. Further, when the recording-and-reproducing device 60 is connected to the image pick-up device, it controls operations of the recording-and-reproducing device 60 based on the operation signal PS.

Figure 3:
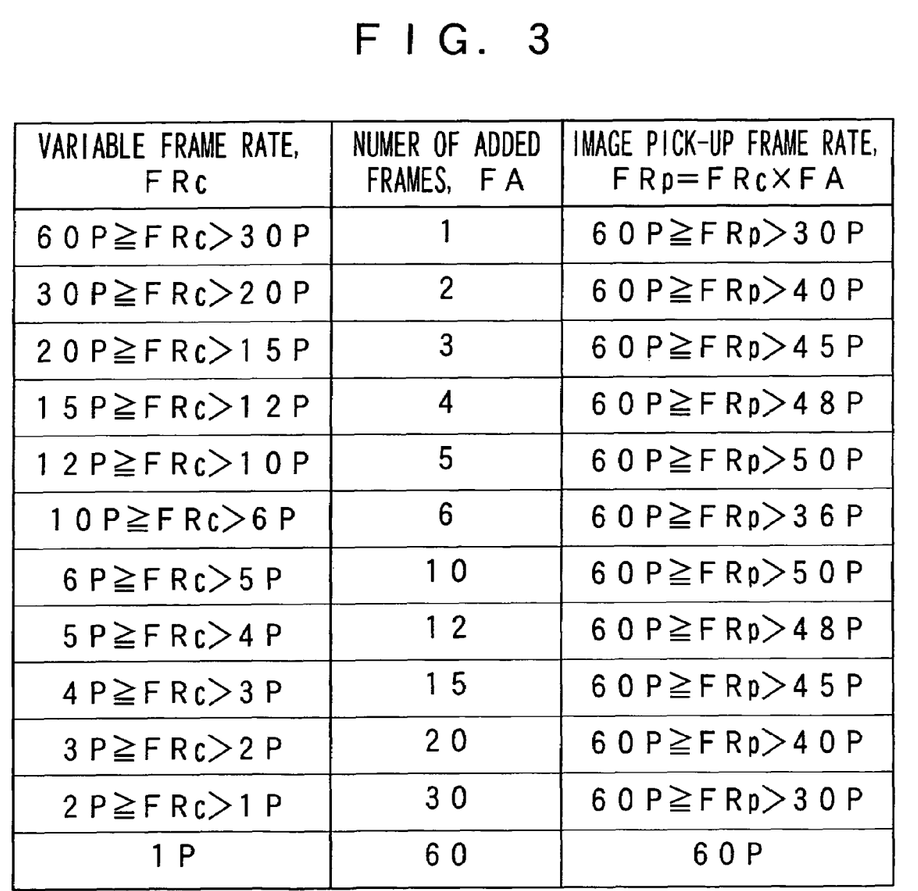
FIG. 3 is a diagram for showing a relationship of the number of added frames and an image pick-up frame rate with respect to a variable frame rate.

Next, operations of the image pick-up device will be described. A frame rate (variable frame rate FRc) of a picked-up image which is set by the frame rate set signal RSF can be varied continuously by changing over a frame rate (image pick-up frame rate FRp) of the picked-up image signal Spa which is generated by the image pick-up portion 11 and the number of added frames FA which is used by the frame-addition-processing portion 14 as described above. For example, as shown in FIG. 3, when the variable frame rate FRc is set into a range of "60P≧FRc>30P" by the frame rate set signal RSF, the number of added frames FA is set to "1" and the image pick-up frame rate FRp is equalized to the variable frame rate FRc. When the variable frame rate FRc is set into a range of "30P≧FRc>20P", the number of added frames FA is set to "2" and the image pick-up frame rate FRp is set to double the variable frame rate FRc. When the variable frame rate FRc is set into a range of "20P≧FRc>15P", the number of added frames FA is set to "3" and the image pick-up frame rate FRp is set to triple the variable frame rate FRc. Subsequently, the image pick-up frame rate FRp and the number of added frames FA are changed over similarly.

Figure 4A:
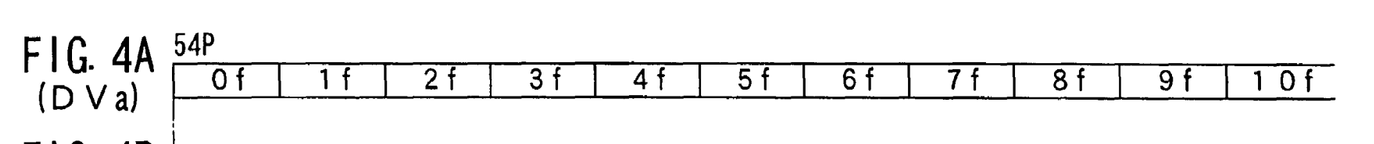
FIG. 4A is a diagram for explaining generation operation of an image signal DVb.
Figures 4B, 4C:
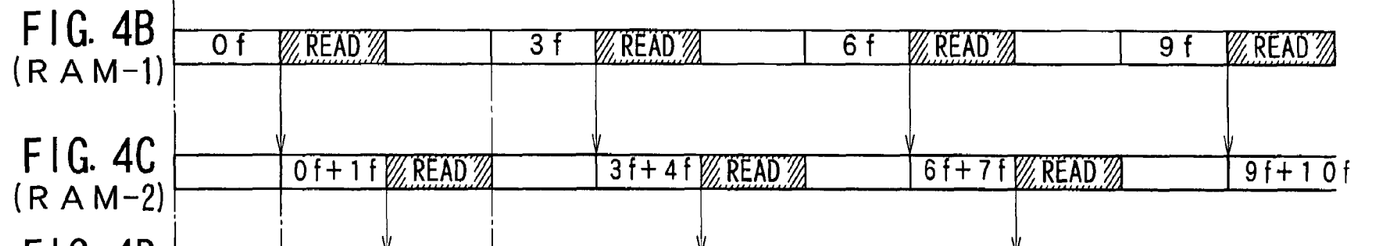
FIG. 4B is a diagram for explaining the generation operation of the image signal DVb.
FIG. 4C is a diagram for explaining the generation operation of the image signal DVb.
Figures 4D, 4E:
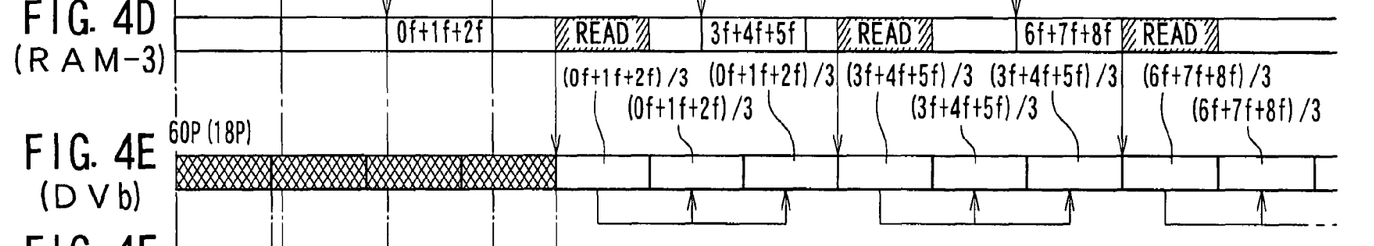
FIG. 4D is a diagram for explaining the generation operation of the image signal DVb.
FIG. 4E is a diagram for explaining the generation operation of the image signal DVb.

FIGS. 4A-4F each is diagram for explaining generation of the image signal DVb. For example, if the variable frame rate FRc is "18P", the image pick-up frame rate is "54P" and the number of added frames FA is "3". It is to be noted that FIG. 4A shows frames of the image signal DVa, FIGS. 4B, 4C, and 4D show operations of the RAM-1, RAM-2, and RAM-3 of the frame-addition-processing portion 14, respectively, and FIG. 4E shows frames of the image signal DVb. Further, an output frame rate, which is a frame rate of the image signal DVb, is set to, for example, "60P" to match equipment which is supplied with the image signal DVb.

At time point t1 shown in FIGS. 4A-4E, when frame "0f" of the image signal DVa starts, the frame-addition-processing portion 14 sets, for example, the RAM-1 as a write RAM and stores the image signal DVa of frame "0f" in the write RAM.

At time point t2, when a frame of the image signal DVb starts, the image signal of three frames are not completely added up yet, so that the image signal DVb is rendered of a blank frame.

At time point t3, when frame "0f" of the image signal DVa ends and its frame "1f" starts, the RAM-1 where the image signal of frame "0f" is stored is specified as an internal read RAM and the write RAM is changed over from the RAM-1 to, for example, the RAM-2. Furthermore, the signal stored in the internal read RAM, that is, the signal of frame "0f" stored in the RAM-1 is read and added to the image signal DVa of frame "1f" by an adder and stored in the RAM-2, which is the write RAM.

At time point t4, when frame "1f" of the image signal DVa ends and its frame "2f" starts, to generate a three-frame sum signal, the RAM-2 in which the sum signal of frames "0f" and "1f" is written is specified as the internal read RAM. Further, the write RAM is changed over from the RAM-2 to, for example, the RAM-3. Furthermore, the signal stored in the internal read RAM, that is, the signal stored in the RAM-2 is read and added to the image signal DVa of frame "2f" by the adder and stored in the RAM-3, which is the write RAM.

At time point t5, when frame "2f" of the image signal DVa ends and its frame "3f" starts, the three-frame sum signal obtained by adding up the image signal DVa of three frames is generated completely, so that the RAM-3 in which this three-frame sum signal is stored is specified as an external read RAM. Further, the RAM-1 is set as the write RAM, to store the image signal DVa of frame "3f" in the write RAM.

When the three-frame sum signal is generated and then a frame of the image signal DVb is timed to start, for example, at time point t6 when the frame of the image signal DVb starts, the three-frame sum signal is read from the external read RAM and has its signal level multiplied by (⅓) and is output as the image signal DVb. Further, the frame from which the image signal DVb is generated by reading the three-frame sum signal from the external read RAM is specified to be a frame of a valid image. It is to be noted if the three-frame sum signal is not completely written to the RAM yet or if a frame of the image signal DVb is timed to start when the three-frame sum signal is read completely, the image signal DVb of a previous frame is used repeatedly so that the frame which is not completely written or is read completely, is rendered an invalid image frame. In this case, in the image signal DVb, no blank frame is provided between the image signals of a picked-up image of each frame.

Figure 4F:
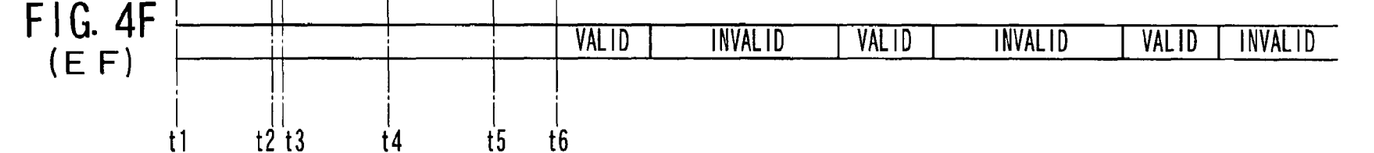
FIG. 4F is a diagram for explaining the generation operation of the image signal DVb.

Subsequently, by similarly using the RAM-1 through the RAM-3, the adder, etc. to add the signal DVa of three frames so that a three-frame sum signal may be generated and reading this three-frame sum signal at timing when a frame of the image signal DVb starts, it is possible to obtain the image signal DVb of an output frame rate in which a valid image is contained at the variable frame rate FRc. That is, as shown in FIG. 4E, it is possible to generate the image signal DVb containing a picked-up image that is valid at a desired variable frame rate of "18P", which is an output frame rate of "60P" that matches the external equipment. It is to be noted that FIG. 4F shows a flag EF that indicates whether a frame of the image signal DVb is of a valid image or an invalid image.

The recording-and-reproducing device 60 extracts an image signal of the valid image from the image signal DVb by utilizing the flag EF and records it in the recording medium 70. Further, when reproducing the recorded image signal, it is read at a reproduction frame rate different from that of the image signal DVb, for example, at a frame rate of "24P", to supply the image signal DVr having the reproduction frame rate to the input selection portion 21. By thus reproducing a signal recorded at a reproduction frame rate different from that of the image signal DVb, it is possible to obtain a picked-up image having a motion speed equivalent to that of an actual subject if the variable frame rate FRc is equalized to the reproduction frame rate. Further, if the variable frame rate FRc is set higher than a reproduction frame rate, it is possible to obtain a picked-up image having slower motion of the subject. If the variable frame rate FRc is set lower than the reproduction frame rate, on the other hand, it is possible to obtain a picked-up image having faster motion of the subject.

The input selection portion 21 selects either the image signal DVr or DVs that has a fixed frame rate as the image signal DVu and supplies it to the frame rate conversion portion 30. The frame rate conversion portion 30 converts the frame rate of the image signal DVu into the image signal DVw synchronized with the frame rate of the image signal DVb.

Figure 5A:
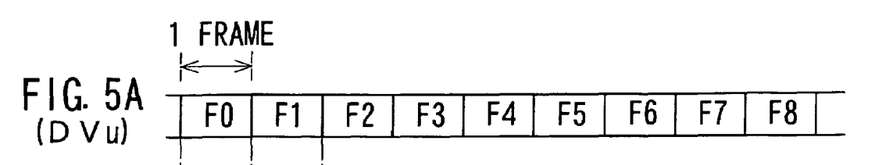
FIG. 5A is a diagram for explaining an operation of a frame rate conversion portion.
Figure 5B:
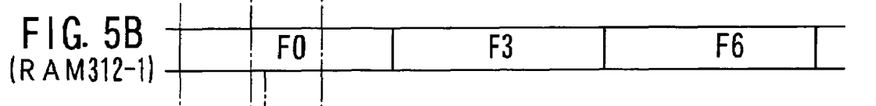
FIG. 5B is a diagram for explaining the operation of the frame rate conversion portion.
Figure 5C:
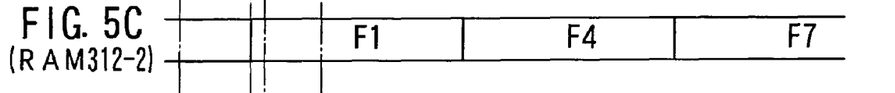
FIG. 5C is a diagram for explaining the operation of the frame rate conversion portion.
Figure 5D:
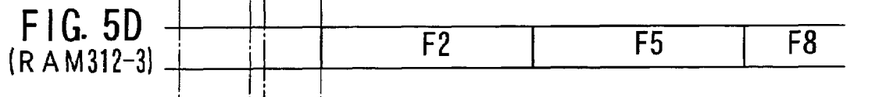
FIG. 5D is a diagram for explaining the operation of the frame rate conversion portion.
Figure 5E:
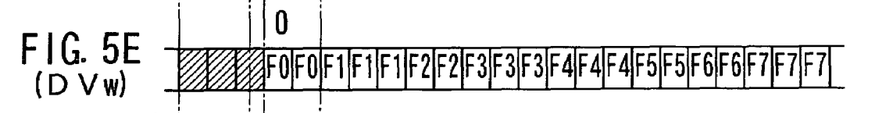
FIG. 5E is a diagram for explaining the operation of the frame rate conversion portion.
Figure 5F:
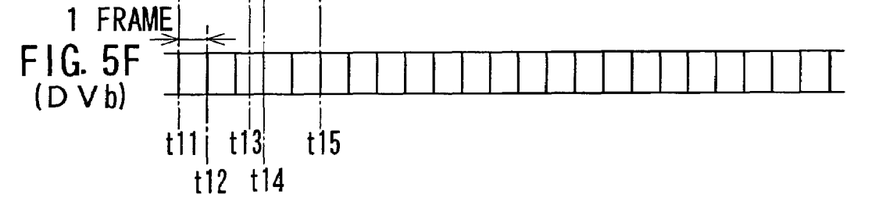
FIG. 5F is a diagram for explaining the operation of the frame rate conversion portion.

FIGS. 5A-5F explain operations of the frame rate conversion portion 30, for example, an operation where the frame rate of the image signal DVb is "60P" and that of the image signal DVu is "24P" as described above. It is to be noted that FIG. 5A shows frames of the image signal DVu, FIG. 5B shows an operation of an RAM312-1, FIG. 5C shows an operation of an RAM312-2, FIG. 5D shows an operation of an RAM312-3, FIG. 5E shows frames of the image signal DVw, and 5F shows frames of the image signal DVb.

At time point t11 shown in FIGS. 5A-5F when frame "F0" of the image signal DVu starts, the frame rate conversion portion 30 sets, for example, the RAM312-1 as a write RAM and supplies the image signal DVu to the write RAM using the signal selector 311, to store the image signal DVu of frame "F0" into the RAM312-1, which is the write RAM.

At time point t12 when a frame synchronized with the image signal DVb is timed to start, the image signal DVu of frame "F0" is not completely written yet, so that the image signal DVw is rendered as a blank frame.

At time point t13 when frame "F0" of the image signal DVu ends and its frame "F1" starts, the RAM 312-1 where the image signal of frame "F0" is stored is specified as a read RAM. Further, the write RAM is changed over from the RAM 312-1 to, for example, the RAM 312-2, to supply the image signal DVu to the write RAM using the signal selector 311 and store the image signal DVu of the next frame "F1" into the RAM 312-2.

At time point t14 when a frame of the image signal DVb is timed to start after the read RAM is specified, the image signal read from the read RAM is selected by the signal selector 313 and output as the image signal DVw.

After that, at time point t15 when frame "F1" of the image signal DVu ends and its frame "F2" starts, the read RAM is changed over from the RAM 312-1 to the RAM 312-2 in which the image signal of frame "F1" is stored. Further, the write RAM is changed over from the RAM 312-2 to the RAM 312-3, to store frame "F2" of the image signal DVu in the RAM 312-3.

Subsequently, by similarly writing the image signals DVu into the RAM 312-1 through the RAM 312-3 at its frame rate and reading these written image signals DVu from the RAM 312-1 through the RAM 312-3 according to an order of frames written at a frame rate synchronized with the image signal DVb, the image signal DVu can be converted into the image signal DVw having a frame rate synchronized with the image signal DVb.

The mix-processing portion 41 can generate the image signal DVmix using the image signals DVb and DVw because these image signals DVb and DVw are synchronized with each other. Further, the wipe-processing portion 42 can generate the image signal DVwp using the image signals DVb and DVw because these signals DVb and DVw are synchronized with each other.

Therefore, by controlling an operation of signal selection so that the image signal DVb may be output from the output selection portion 43 as the monitor image signal DMTout or SMTout, it is possible to monitor a picked-up image. Further, by controlling the operation of signal selection so that the image signal DVw may be output as the monitor image signal DMTout or SMTout, it is possible to display a reproduced image obtained from the recording medium 70 or an image based on the image signal DVs input from the input terminal 22, on an electronic viewfinder or a monitor device.

Figure 6A:
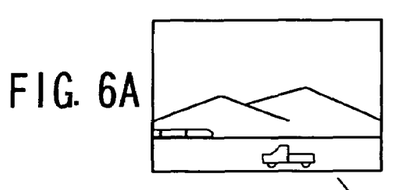
FIG. 6A is a diagram for showing an image example displayed on the basis of a monitor image signal.

Furthermore, by controlling the output selection portion 43 so that the image signal DVmix may be output as the monitor image signal DMTout or SMTout, it is possible to appropriately set an image pick-up direction etc. so that the image picked-up subject may be located to a desired position after image synthesis. For example, to synthesize an image of the subject into a background image, the image signal DVr or DVs of the background image with a different frame rate is converted by the frame rate conversion portion 30 into the image signal DVw that has the same frame rate as the one the image signal DVb has and is synchronized with it. In this case, the picked-up image of the subject is displayed as superimposed on the background image as the monitor image, so that it is possible to easily optimize the pick-up direction and a size etc. of the subject at the time of image pick-up. For example, a background image shown in FIG. 6A is picked up first and recorded in the recording medium 70 and then the image signal DVr of this background image is converted by the frame rate conversion portion 30 into the image signal DVw that is synchronized with the image signal DVb.

Figure 6B:
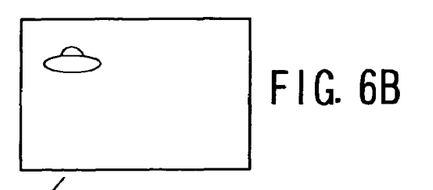
FIG. 6B is a diagram for showing another image example displayed on the basis of the monitor image signal.
Figure 6C:
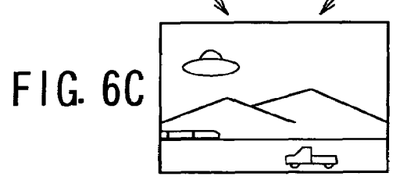
FIG. 6C is a diagram for showing a further image example displayed on the basis of the monitor image signal.

Further, if a subject to be mixed into a background image is picked-up to generate the image signal DVb of a picked-up image shown in FIG. 6B, an image of FIG. 6C in which the subject is mixed into the background image is displayed on a screen of the electronic viewfinder or the monitor device. Therefore, using the image pick-up device capable of imaging the subject at a variable frame rate allows the subject to be picked up in condition where its size and position are matched with the background image, even if the frame rate of the image signal DVb and that of the image signal DVr are different from each other.

Figure 6D:
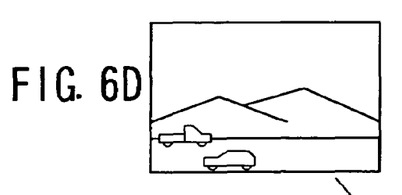
FIG. 6D is a diagram for showing a still further image example displayed on the basis of the monitor image signal.

Furthermore, by controlling the output selection portion 43 so that the image signal DVwp may be output as the monitor image signal DMTout or SMTout, it is possible to set the image pick-up device easily so that a picked-up image having luminance, hue, etc. equivalent to those of a previous picked-up image may be obtained. For example, the image signal DVr of a previous picked-up image shown in FIG. 6D is converted by the frame rate conversion portion 30 into the image signal DVw that is synchronized with the image signal DVb.

Figure 6E:
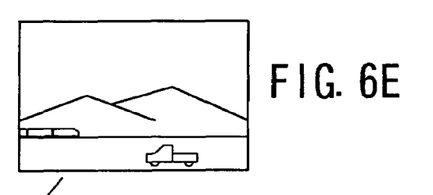
FIG. 6E is a diagram for showing an additional example displayed on the basis of the monitor image signal.
Figure 6F:
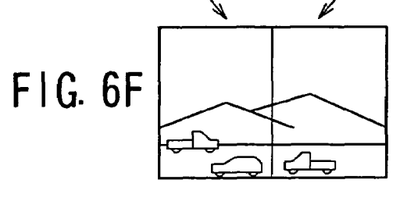
FIG. 6F is a diagram for showing an additional image example displayed on the basis of the monitor image signal.

Further, if the image signal DVb of a current picked-up image shown in FIG. 6E is generated, the previous picked-up image and the current one are displayed simultaneously on the screen of the electronic viewfinder or the monitor device as shown in FIG. 6F. Therefore, even if an image pick-up device capable of imaging a subject at a variable frame rate is used, the image pick-up device can be set easily by comparing the two picked-up images to each other.

Although, in the above embodiment, the image signal DVu has been synchronized in the frame rate conversion portion 30 with the image signal DVb of a picked-up image, the image signal DVb may be input to the frame rate conversion portion 30 to be synchronized with the image signal DVr or DVs so that the image signal DVmix or DVwp can be generated. However, if the image signal DVb is input to the frame rate conversion portion 30, a signal written at a frame rate of the image signal DVb is read at a frame rate of the image signal DVr or DVs, so that an image may be delayed when it is being picked up. Therefore, it is preferable to convert the frame rate of the image signal DVr or DVs and synchronize it with the image signal DVb.

According to the present invention, the frame rate of the first image signal of a variable frame-rate picked-up image is matched with that of the second image signal from the outside, so that these first and second image signals having this matched frame rate are used to generate a monitor image signal. Therefore, it is possible to images having different frame rates on one screen simultaneously.

Further, by thus matching the frame rate of the second image signal with that of the first image signal, it is possible to prevent signal delay due to frame rate conversion from occurring in the first image signal, thereby displaying a variable frame-rate picked-up image without delay.

Further, the first and second image signals are used to generate, as a monitor image signal, an image signal of an image in which an image based on the first image signal and an image based on the second image signal are mixed, so that it is possible, for example, to superimpose an image being picked up on a background image etc. picked up beforehand and display it. Furthermore, the first and second image signals are used to generate, as a monitor image signal, an image signal of an image in which a part of an image based on the first image signal is replaced by an image based on the second image signal. Therefore, it is possible to easily adjust the image pick-up device in such a manner that when an image picked up already and an image being picked up are displayed on one screen simultaneously, the image being picked up may have luminance, hue, etc. equivalent to those of the already picked-up image.

INDUSTRIAL APPLICABILITY

As described above, an image pick-up device according to the present invention could well be applied to the case of displaying not only an image being picked up but also an image based on an image signal supplied from an outside on one screen simultaneously.

The invention claimed is:

1. An image pick-up device comprising:
control means for generating a synchronizing signal;
image signal pick-up means, connected to the control means, for picking up an image signal with a varied frame-rate;
frame-addition processing means, connected to the image signal pick-up means and the control means, for generating a first image signal, from the variable frame-rate picked-up image signal, with a selected output frame rate based upon the synchronization signal;
frame rate conversion means connected to the control means and an external device, the frame rate conversion means for converting a frame rate of a second image signal, supplied from the external device, to the output frame rate of the first image signal based upon the synchronization signal; and
monitor image generation means, connected to the frame-addition processing means and the frame rate conversion means, for generating a monitor image signal for display by a monitor by using the first image signal and the second image signal.

2. The image pick-up device according to claim 1, wherein the frame-addition processing means generates the output frame rate of the first image signal by adding a selected number of frames to the image signal.

3. The image pick-up device according to claim 1, wherein the monitor image generation means uses the first and second image signals to generate, as the monitor image signal, an image signal of an image in which an image based on the first image signal and an image based on the second image signal are mixed.

4. The image pick-up device according to claim 1, wherein the monitor image generation means uses the first and second image signals to generate, as the monitor image signal, an image signal of an image in which a part of an image based on the first image signal is replaced by an image based on the second image signal.

5. The image pick-up device according to claim 1, wherein the external device is either a recording/reproducing device or an input terminal.

6. The image pick-up device according to claim 1, further comprising an input terminal, a recording/reproducing means for recording and reproducing the first image signal, and an input selection means for selecting the second image from the input terminal or the recording/reproducing means.

7. The image pick-up device according to claim 6, wherein the input selection means inputs the selected second image signal to the frame rate conversation means.

8. The image pick-up device according to claim 1, wherein the monitor image generation means uses the first and second image signals to generate, as the monitor image signal, an image signal of an image in which an image based on the first image signal and an image based on the second image signal are superimposed.

9. The image pick-up device according to claim 1, wherein the monitor image generation means generates the monitor image signal using images from the first and second image signals simultaneously on one screen.

10. An image pick-up device comprising:
control portion generating a synchronization signal;
pick-up portion, connected to the control portion, picks up an image signal with a varied frame-rate;
frame-addition processing portion, connected to the pick-up portion and the control portion, generates a first image signal, from the variable frame-rate picked-up image signal, with a desired output frame rate based upon the synchronization signal;
a frame rate conversion portion connected to the control portion and external device, the frame rate conversion portion converts a frame rate of a second image signal, supplied from the external device, to the output frame rate of the first image signal based upon the synchronization signal; and
a monitor image generation portion, connected to the frame-addition processing portion and the frame rate conversion portion, that generates a monitor image signal for display by a monitor by using the first image signal and the second image signal.

11. The image pick-up device according to claim 10, wherein the frame-addition processing portion generates the output frame rate of the first image signal by adding a predetermined number of frames to the image signal.

12. The image pick-up device according to claim 10, wherein the monitor image generation portion uses the first and second image signals to generate, as the monitor image signal, an image signal of an image in which an image based on the first image signal and an image based on the second image signal are superimposed.

13. The image pick-up device according to claim 10, wherein the monitor image generation portion uses the first and second image signals to generate, as the monitor image signal, an image signal of an image in which a part of an image based on the first image signal is replaced by an image based on the second image signal.

14. The image pick-up device according to claim 10, wherein the external device is either a recording/reproducing device or an input terminal.

15. The image pick-up device according to claim 10, further comprising an input terminal, a recording/reproducing portion recording and reproducing the first image signal, and an input selection portion selecting the second image from the input terminal or the recording/reproducing portion.

16. The image pick-up device according to claim 15, wherein the input selection portion inputs the selected second image signal to the frame rate conversation portion.

17. The image pick-up device according to claim 10, wherein the monitor image generation portion generates the monitor image signal using images from the first and second image signals simultaneously on one screen.

* * * * *